(12) United States Patent
Dittly

(10) Patent No.: US 7,874,235 B2
(45) Date of Patent: Jan. 25, 2011

(54) GAME FIELD DRESSING SAFETY TOOL

(76) Inventor: Bruce W. Dittly, 1192 Doebler Dr., North Tonawanda, NY (US) 14120

( * ) Notice: Subject to any disclaimer, the term of this patent is extended or adjusted under 35 U.S.C. 154(b) by 0 days.

(21) Appl. No.: 12/586,481

(22) Filed: Sep. 24, 2009

(65) Prior Publication Data

US 2010/0018063 A1 Jan. 28, 2010

Related U.S. Application Data

(62) Division of application No. 11/800,935, filed on May 8, 2007, now abandoned.

(51) Int. Cl.
*B26D 3/00* (2006.01)
*B26B 29/02* (2006.01)

(52) U.S. Cl. .................. 83/13; 30/286; 30/294

(58) Field of Classification Search .......... 30/285, 30/286, 288, 289, 294, 298, 340; 83/13
See application file for complete search history.

(56) References Cited

U.S. PATENT DOCUMENTS

| | | | | |
|---|---|---|---|---|
| 2,767,468 A | * | 10/1956 | Rogal | 30/240 |
| 2,920,668 A | * | 1/1960 | Leist | 30/510 |
| 3,114,402 A | * | 12/1963 | Jacoff | 30/519 |
| 4,087,911 A | * | 5/1978 | Schrock et al. | 30/286 |
| 4,290,202 A | * | 9/1981 | Nadenoff | 30/382 |
| 4,428,515 A | * | 1/1984 | Mayer | 224/232 |
| 4,494,310 A | * | 1/1985 | Slaughter | 30/155 |
| 4,502,218 A | * | 3/1985 | Carter et al. | 30/138 |
| 4,707,920 A | * | 11/1987 | Montgomery | 30/294 |
| 4,841,640 A | * | 6/1989 | Daniels | 30/294 |
| 4,924,924 A | * | 5/1990 | Stewart | 142/49 |
| 5,127,162 A | * | 7/1992 | Mansfield | 30/294 |
| 5,146,810 A | * | 9/1992 | Mueller | 74/558 |
| 6,076,261 A | * | 6/2000 | Eriksson et al. | 30/151 |
| 6,460,255 B1 | * | 10/2002 | Dassaud | 30/340 |
| 6,964,100 B1 | * | 11/2005 | Musland | 30/286 |

* cited by examiner

*Primary Examiner*—Hwei-Siu C Payer
(74) *Attorney, Agent, or Firm*—Robert Nathans

(57) ABSTRACT

The right handed hunter uses a special safety tool having a pistol grip handle firmly gripped by the hunter's left hand and having a slot formed in a forward portion of the safety tool for receiving a knife blade with its cutting blade up during dressing of the game. With the right hand of the hunter gripping the knife handle and holding the knife blade within the slot, he pushing the safety tool forward with his left hand while pushing the knife forward with his right hand to form an elongated cut in the game. This arrangement ensures that both hands are safely kept well away from the cutting edge of the knife blade while forming the elongated cut. The slot is a deep one, formed in the forward portion of the safety tool, enabling the tool to receive types of widely used knife blades of any shape.

20 Claims, 2 Drawing Sheets

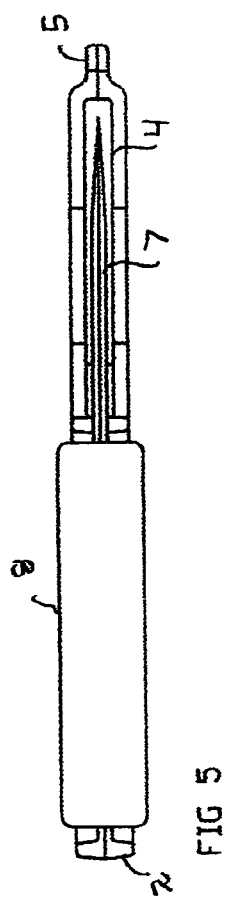
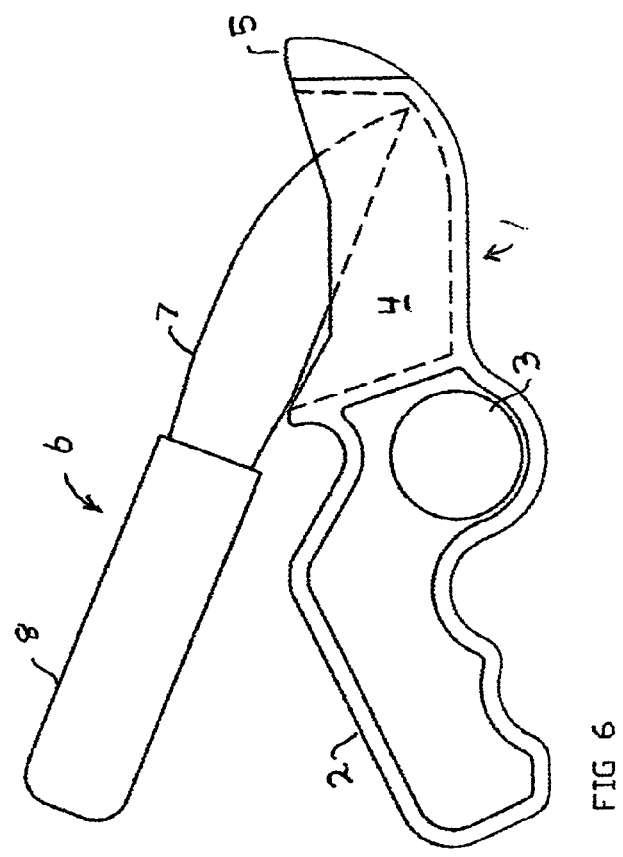

GAME FIELD DRESSING SAFETY TOOL

CROSS-REFERENCE TO RELATED APPLICATIONS

This application is a division of U.S. patent application Ser. No. 11/800,935 filed May 8, 2007, now abandoned.

BACKGROUND OF THE INVENTION

The present invention relates to the field of dressing of large hunted game. U.S. patent to Goodwin, U.S. Pat. No. 4,290,202 issued Sep. 22, 1981 discloses a field game dressing device that is attached to a knife and covers the knife tip. The cutting edge of the knife faces upwardly and is pushed forward to produce the required elongated cut in the hide of the game after the initial short cut that accommodates the cutting edge of the knife. The top portion of the tip of the field dressing device lifts the hide of the animal upwardly to best position it to be cut, while the bottom portion of the tip of the field dressing device is configured to push the entrails of the game downwardly away from the knife which prevents the entrails from being cut, which cutting could otherwise contaminate the meat of the game. The device is attached to the knife by a string that is wrapped about the knife handle for holding the device in place over the knife tip. The inventor states in col. 3 of the patent that the string can serve to retrieve the device if it should fall off within the animal being gutted. Accordingly, the present inventor regards this attachment of the dressing device to the knife to be a detriment. Additionally, if the hunter becomes distracted during cutting of the elongated cut, he could turn the knife downwardly and accidentally cut his fingers or hand. Accidentally turning the cutting edge of the knife downwardly could also occur in the knife guard apparatus of patent U.S. Pat. No. 6,964,100 issued to Musland on Nov. 15, 2005. This knife guard also has the disadvantage of not allowing the use of knives of varying configurations.

BRIEF SUMMARY OF A PREFERRED EMBODIMENT OF THE INVENTION

In accordance with the present invention, a special, rugged, safety tool is provided, having a safety tool pistol grip handle configured to be firmly gripped by the left hand of a right handed hunter and having a deep knife blade support slot formed in a forward portion of the safety tool for receiving the knife blade, with its cutting blade up, during dressing of the game, and wherein the knife blade slot is configured to keep the knife handle above and away from the safety tool for facilitating gripping of the knife handle by the right hand of the hunter. With the right hand of the hunter gripping the knife handle and holding the knife blade within the slot, the hunter pushes the safety tool forward with his left hand while pushing the knife forward with his right hand to form the required elongated cut in the game. This arrangement, in contrast with the teachings of the aforesaid patents, ensures that both hands are kept well away from the cutting edge of the knife blade while forming the elongated cut to prevent accidental cutting of the hunter's fingers or hands.

Also, the deep elongated slot formed in the forward portion of the safety tool renders the tool capable of receiving knife blades of numerous configurations. Thus the tool can be used with virtually any knife already in the hands of the hunter.

BRIEF DESCRIPTION OF THE DRAWINGS

Other features and advantages of the invention may become apparent upon reading of the following detailed description, taken in conjunction with the drawings in which:

FIG. 5 discloses a top view of the safety tool with the knife edge positioned therein;
and
FIG. 6 discloses a front view of the safety tool with the knife edge positioned therein.

DETAILED DESCRIPTION OF A PREFERRED EMBODIMENT OF THE INVENTION

Figure 4:
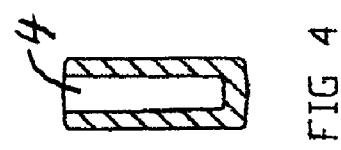
FIG. 4 discloses a sectional view taken through B in FIG. 1.
Figure 3:
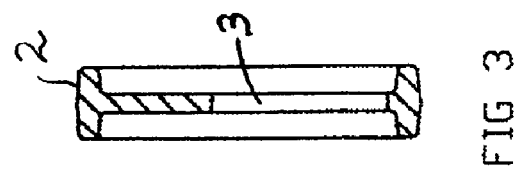
FIG. 3 discloses a sectional view taken through A in FIG. 1.
Figure 1:
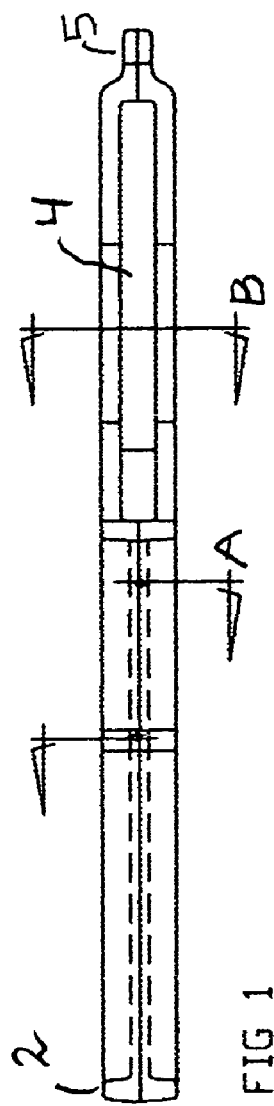
FIG. 1 discloses a top view of the safety tool.
Figure 2:
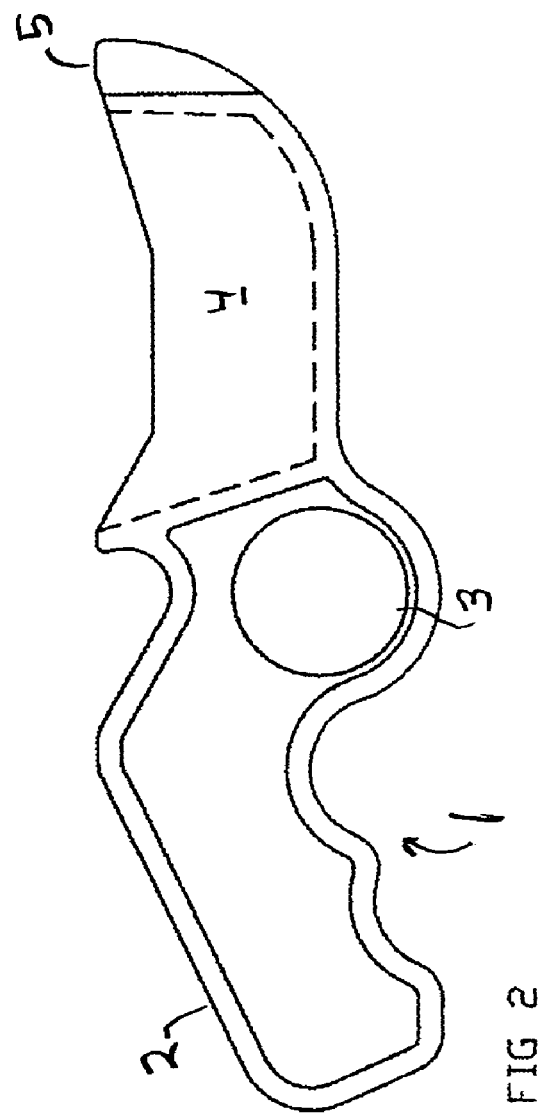
FIG. 2 discloses a front view of the safety tool.

As shown in FIGS. 1 and 2, a safety tool 1 has a tool handle 2 configured in the form of a pistol grip and having a finger hole 3 for receiving one or more fingers of the hunter for producing good tight control of the tool. The forward portion of the tool has a knife blade support portion preferably in the form of a deep elongated slot 4 for receiving the cutting blade of the knife as shown in FIGS. 5 and 6. Nose portion 5 pushes the hide upwardly and away from the entrails of the animal, typically a deer, for deterring contamination of the meat, by cutting into the entrails , as the knife and tool are urged forwardly together. Finger hole is also shown in the FIG. 3 sectional within the tool handle 2 whereas the lower slot portion is shown in the FIG. 4 sectional.

The left hand of a right handed hunter firmly grips the tool handle 2 with its finger hole 3 and the hunter inserts the knife blade 7 of knife 6, cutting edge up, into the slot 4 as shown in FIG. 6 by grasping the knife handle 8 with his right hand. The blade is preferably oriented at roughly 45 degrees from the horizontal as shown. The knife 6 is also shown in the top view of FIG. 5 with its blade 7 positioned within slot 4. The knife handle 8 and nose portion 5 is also shown in this figure.

With the right hand of the hunter gripping the knife handle 8, and keeping the knife blade 7 within the slot 4, the hunter pushes the safety tool forward with his left hand while simultaneously pushing the knife forward with his right hand to form the required elongated cut in the hide. This arrangement, in contrast with the teachings of the aforesaid patents, actually forces keeping both hands far away from the cutting edge of the knife blade while forming the elongated cut. Thus an important benefit of the invention prevents accidental cutting of the hunter's fingers or hands. Of course, left handed hunters would usually use the right hand to grip the safety tool and the left hand to grip the knife handle.

The deep elongated slot formed in the forward portion of the safety tool renders the tool capable of receiving knife blades of numerous configurations. Thus the tool can be used with virtually any knife already in the hands of the hunter. Of course the safety tool could optionally be sold along with a suitable knife. The safety tool could be economically manufactured as a single rugged piece of injection molded plastic.

Thus the preferred method of the invention includes:
(a) providing said hunter with a safety tool 1 shown in FIG. 6 having a given length for enabling the hunter to safely field dress a large game animal by cutting its hide with a knife, said safety tool having
(a-1) a pistol grip handle 2 and knife blade support portion 4 positioned in tandem with and alongside and not under said pistol grip handle along the length of said safety tool, said knife blade support portion including an elongated slot having an opening across almost the entire top portion of said knife support portion for receiving and supporting a major portion of said knife blade with its cutting edge up;

(a-2) said knife blade support portion having a nose portion 5 the end of said safety tool and located along said top portion of the knife blade support portion and in line with an upper portion of said pistol grip handle and configured for pushing the hide upwardly and away from entrails of said game animal;

(b) positioning the cutting edge of the knife blade within and above said elongated slot with its cutting edge up; and thereafter (c) gripping and pushing said pistol grip handle forward with a first hand of said hunter, and pushing the knife forward with a second hand of said hunter for forming an elongated cut in the hide of the game in accordance with dressing of said large game animal.

Preferably, the knife blade support portion has an elongated slot 4 that is wide enough and deep enough for facilitating receiving knife blades of numerous configurations, and the safety tool is made of a single piece.

While the invention has been described in connection with a preferred embodiment, the description is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A method enabling a hunter to safely field dress a large game animal comprising the steps of:
   (a-1) providing said hunter with a safety tool for enabling the hunter to safely field dress a large game animal by cutting its hide with a knife, said safety tool having a safety tool handle extending along a longitudinal direction and a knife blade support portion including an elongated slot having an opening across a substantial length of an upper portion of said knife blade support portion and extending along said longitudinal direction for receiving and supporting a knife blade with its cutting edge up;
   (a-2) said knife blade support portion having a nose portion located at an upper portion of the knife blade support portion and configured for pushing the hide upwardly and away from entrails of said game animal;
   (b) positioning a cutting edge of the knife blade within and above said elongated slot with its cutting edge up and positioning a handle of the knife above the safety tool handle; and thereafter
   (c) pushing the safety tool forward with a first hand of said hunter holding the safety tool handle while pushing the knife forward with a second hand of said hunter holding the knife handle for forming an elongated cut in the hide of the game in accordance with dressing of said large game animal.

2. The method of claim 1 wherein said handle is a pistol grip handle configured like a handle of a pistol.

3. The method of claim 2 wherein said safety tool is made of a single piece.

4. The method of claim 2 wherein said elongated slot is wide enough and deep enough for facilitating receiving knife blades of numerous configurations.

5. The method of claim 1 wherein said elongated slot is deep enough to receive and contain more than a very small portion of the cutting edge of said knife blade, thereby to deter jumping of the knife blade out of the elongated slot that can cut said hunter.

6. The method of claim 5 wherein said elongated slot is wide enough and deep enough for facilitating receiving knife blades of numerous configurations.

7. The method of claim 1 wherein said elongated slot is wide enough and deep enough for facilitating receiving knife blades of numerous configurations.

8. A method enabling a hunter to safely field dress a large game animal comprising the steps of:
   (a-1) providing said hunter with a safety tool having a given length for enabling the hunter to safely field dress a large game animal by cutting its hide with a knife, said safety tool having a handle and a integrally formed knife blade support portion positioned in tandem with and not under said handle along the length of said safety tool, said knife blade support portion including an elongated slot having an opening across a substantial length of a top portion of said knife support portion for receiving and supporting a knife blade with its cutting edge up;
   (a-2) said knife blade support portion having a nose portion located at the end of the safety tool and along the top portion of the knife blade support portion and configured for pushing the hide upwardly and away from entrails of said game animal;
   (b) positioning the cutting edge of the knife blade within and above said elongated slot with its cutting edge up and positioning a handle of the knife above the safety tool handle; and thereafter
   (c) gripping and pushing said safety tool handle forward with a first hand of said hunter and pushing the knife forward with a second hand of said hunter holding the knife handle for forming an elongated cut in the hide of the game in accordance with dressing of said large game animal.

9. The method of claim 8 wherein said handle is a pistol grip handle.

10. The method of claim 9 wherein said safety tool is made of a single piece.

11. The method of claim 10 wherein said elongated slot is wide enough and deep enough for facilitating receiving knife blades of numerous configurations.

12. The method of claim 9 wherein said elongated slot is wide enough and deep enough for facilitating receiving knife blades of numerous configurations.

13. The method of claim 8 wherein said elongated slot is deep enough to receive and contain more than a very small portion of the cutting edge of said knife blade, thereby to deter jumping of the knife blade out of the elongated slot that can cut said hunter.

14. The method of claim 13 wherein said elongated slot is wide enough and deep enough for facilitating receiving knife blades of numerous configurations.

15. The method of claim 8 wherein said elongated slot is wide enough and deep enough for facilitating receiving knife blades of numerous configurations.

16. A method enabling a hunter to safely field dress a large game animal comprising the steps of:
   (a) providing said hunter with a safety tool having a given length for enabling the hunter to safely field dress a large game animal by cutting its hide with a knife, said safety tool having
   (a-1) a pistol grip handle a knife blade support portion positioned in tandem with and alongside of and not under said pistol grip handle along the length of said safety tool, said knife blade support portion including an elongated slot having an opening across almost the entire top portion of said knife support portion for receiving and supporting a major portion of a knife blade with its cutting edge up;

(a-2) said knife blade support portion having a nose portion at the end of said safety tool and located along said top portion of the knife blade support portion and configured for pushing the hide upwardly and away from entrails of said game animal;

(b) positioning the cutting edge of the knife blade within and above said elongated slot with its cutting edge up and positioning a handle of the knife above the pistol grip handle; and thereafter (c) gripping and pushing said pistol grip handle forward with a first hand of said hunter, and pushing the knife forward with a second hand of said hunter holding the knife handle for forming an elongated cut in the hide of the game in accordance with dressing of said large game animal.

17. The method of claim 16 wherein said safety tool is made of a single piece.

18. The method of claim 16 wherein said elongated slot is wide enough and deep enough for facilitating receiving knife blades of numerous configurations.

19. The method of claim 18 wherein said elongated slot is deep enough to receive and contain more than a very small portion of the cutting edge of said knife blade, thereby to deter jumping of the knife blade out of the elongated slot that can cut said hunter.

20. The method of claim 16 wherein said elongated slot is deep enough to receive and contain more than a very small portion of the cutting edge of said knife blade, thereby to deter jumping of the knife blade out of the elongated slot that can cut said hunter.

* * * * *